No. 12,235. REISSUED JUNE 21, 1904.
E. WESTON & A. O. BENECKE.
RECORDING ELECTRICAL MEASURING INSTRUMENT.
APPLICATION FILED AUG. 6, 1903.
3 SHEETS—SHEET 1.
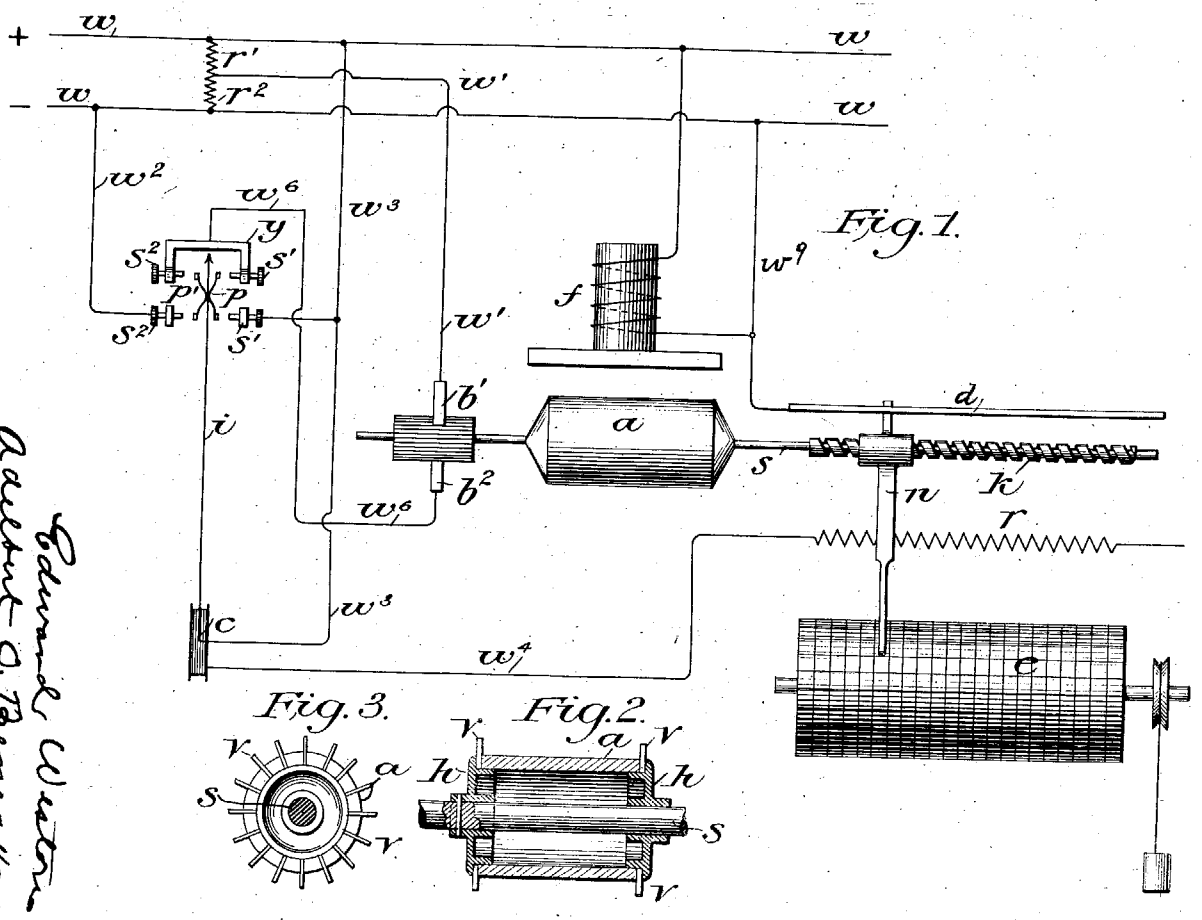
Witnesses:
M. F. Keating
A. T. Conly
Edward Weston
Adelbert O. Benecke
Inventors:
By atty
Charles J. Kintner No. 12,235. REISSUED JUNE 21, 1904.
E. WESTON & A. O. BENECKE.
RECORDING ELECTRICAL MEASURING INSTRUMENT.
APPLICATION FILED AUG. 6, 1903.
3 SHEETS—SHEET 2.
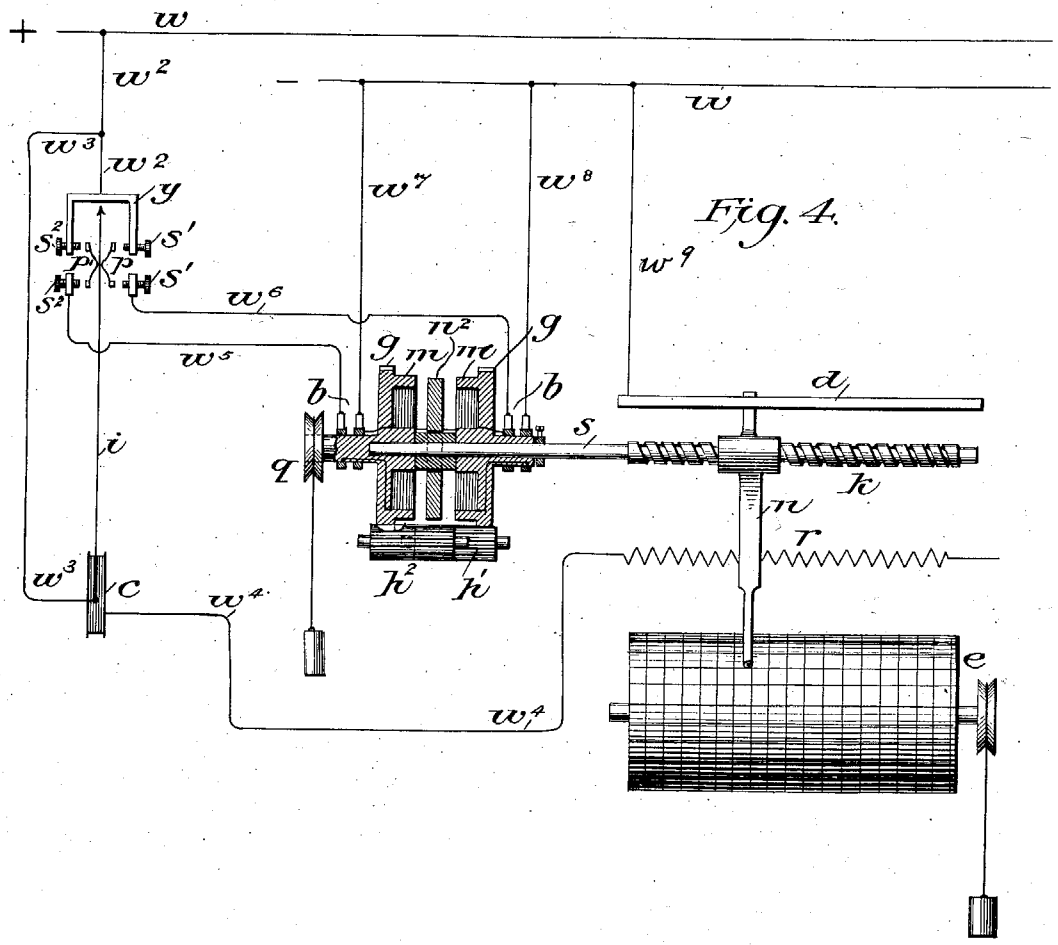
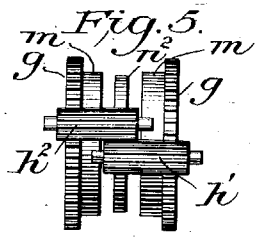
Witnesses:
M. F. Keating
A. T. Comey
Edward Weston
Adelbert O. Benecke
Inventors
By atty
Charles J. Kintner No. 12,235. REISSUED JUNE 21, 1904.
E. WESTON & A. O. BENECKE.
RECORDING ELECTRICAL MEASURING INSTRUMENT.
APPLICATION FILED AUG. 6, 1903.
3 SHEETS—SHEET 3.
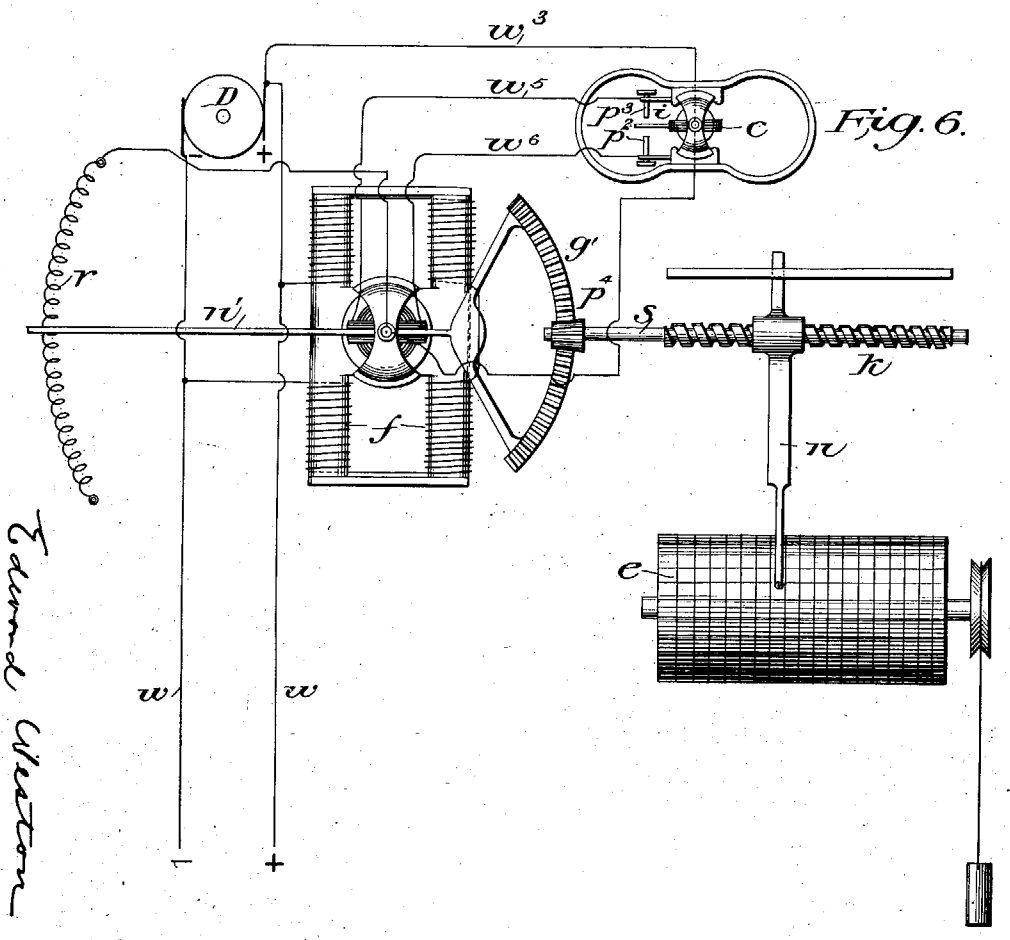
Witnesses:
M. F. Keating
A. T. Conroy
Edward Weston
Adelbert O. Benecke
Inventors
By atty
Charles J. Kintner No. 12,235. Reissued June 21, 1904.

UNITED STATES PATENT OFFICE.

EDWARD WESTON, OF NEWARK, AND ADELBERT O. BENECKE, OF VAILSBURG, NEW JERSEY.

RECORDING ELECTRICAL MEASURING INSTRUMENT.

SPECIFICATION forming part of Reissued Letters Patent No. 12,235, dated June 21, 1904.

Original No. 713,257, dated November 11, 1902. Application for reissue filed August 6, 1903. Serial No. 168,471.

*To all whom it may concern:*

Be it known that we, EDWARD WESTON, a subject of the King of Great Britain, residing at Newark, and ADELBERT O. BENECKE, a subject of the Emperor of Germany, residing at Vailsburg, in the county of Essex and State of New Jersey, have made a new and useful Invention in Recording Electrical Measuring Instruments, of which the following is a specification.

Our invention is directed to improvements upon instruments disclosed in two prior patents granted to Edward Weston by the United States Patent Office on the 31st day of January and 4th day of April, 1893, and numbered, respectively, 490,699 and 494,829 and will be understood by referring to the following specification and accompanying drawings, the especial points of novelty being particularly pointed out in the claims at the end of the specification.

Figures 1 and 6 are part-diagrammatic and part-plan views illustrating our improvements as applied to voltmeters. Fig. 4 is a part-diagrammatic and part-plan view of a modified form of the invention, the means for reversing the direction of motion of the recording-stylus carried by the power-impelled shaft being shown therein in sectional view. Fig. 2 is a sectional view taken through the core of the preferred form of rotary armature, which drives the recording mechanism when an electric motor is used for that purpose, as illustrated in the modified form shown in Fig. 1. Fig. 3 is an end elevational view of the same as seen looking at Fig. 2 in either direction with one of the conducting heads or caps of the armature-core removed. Fig. 5 is a detail view illustrating the gearing and connected parts for reversing the direction of motion of the recording-stylus of that form of the invention illustrated in Fig. 4.

Our invention has for its objects, first, to provide means whereby an increased range of record may be effected and in such manner as to make a permanent record of relatively small changes either of differences of current potential or of current flow or of the work being done in an electrical circuit, according to the type of instrument employed; second, to provide novel means whereby the recording-stylus may be driven by a rotary movable armature capable of making either a fractional part of a revolution or a number of revolutions in either direction and in such manner as to give to said stylus wide ranges of movement over the record-receiving surface or sheet; third, to provide a power-driven recording mechanism in connection with instruments like those disclosed in the before-mentioned patents in which the record shall be placed upon a record sheet or surface having rectangular coördinate lines and in such manner that the spaced coördinates of the record as to time and as to quantity or potential or the work done shall bear a definite or fixed relation to each other; fourth, to combine with the motor-driven part of the recording instrument a dampening device, which will instantly check the movement of the rotary part thereof, and hence the movement of the stylus when the propelling part is disconnected from the working source which drives it; fifth, to provide an armature-core for the armature that drives the recording-stylus which shall be of such a nature as to start and stop instantaneously on connecting or disconnecting the working current through or from the coils thereof, thus making the instrument far more accurate in its recording function than was possible with the instruments disclosed in the before-mentioned patents.

In each of the instruments referred to there is a vibrating recording-arm which carries a stylus or pointer at its free end, said stylus being adapted to move over a record divided into coördinate lines indicating hours and amperes or volts, according to the type of instrument used. With such an instrument, however, it became necessary to vary the relation of the coördinate lines of the record representing amperes or volts in order to compensate for the angular variation of the recording-stylus at the extreme limits of its movement, as is obvious on inspection of the drawings of Patent No. 490,699, above referred to, and on examination of the specification thereof, lines 54 to 68, inclusive, page 2. The present improvements are designed to overcome these objections and to provide an electrically-controlled recording instrument which shall give accurate records of differences of potential or changes of current or the rate of doing work in a system of electrical energy and of the time when such changes took place.

For a full and clear understanding of our invention, such as will enable others skilled in the art to construct and use the same, reference is now had to the accompanying drawings and first to Fig. 1, in all of which like letters of reference represent like parts wherever used. *w w* represent two current-mains connected to a source of current-supply and one or more electrical translating devices, (not shown,) and *f* represents the field-magnet of an electric motor the coils of which are connected in shunt with the current-mains. *a* represents the rotary armature thereof, the shaft *s* of which is connected at one end to a worm or screw *k*, the threads being of any desired pitch, dependent upon the power of the motor to drive it and the magnitude of the record it is desired to produce. *n* is a conducting-arm provided with the requisite nut or connection for adapting it to be moved in either direction by the worm or screw *k*, said arm supporting at its free end a recording-stylus of any well-known form. *d* is a metal or other conducting-bar under which one end of the conducting-arm *n* rests, said bar being electrically connected to the main *w* by a conductor $w^9$, and *r* a known variable resistance the individual coils of which are adapted to be electrically connected with the arm *n* as it is moved back and forth thereover. *e* is a cylinder adapted to carry a sheet of recording-paper or other material properly spaced with coördinate lines indicating hours and amperes or volts or watts, said cylinder being driven by a time-controlled clock mechanism, (not shown,) and hence at a definite speed. *c* represents the movable member, coil, or part, and *i* the index-needle of a volt-meter not substantially different from the like parts of well-known instruments of the Weston type. *p p'* are pairs of contacts carried by the index-needle *i* and adapted to contact when moved in opposite directions with adjustable stationary contacts *s' s'* $s^2$ $s^2$, supported by the base of the instrument and a yoke *y*. $w^6$ is a conductor running from the yoke *y* to one of the commutator-brushes $b^2$. $r'$ $r^2$ represent a resistance-coil connected in circuit between the current-mains *w w*, and $w'$ is a conductor running from the middle of said resistance to the other commutator-brush, $b'$. $w^3$ is a conductor connecting the + current-main *w* with the movable coil *c*, which is connected in turn by conductor $w^4$ with the resistance *r*, with which the movable conducting-arm *n* is adapted to contact as it is moved thereover by the worm *k* in opposite directions, as hereinbefore indicated. The conductor $w^3$ is also connected to one of the contact-points *s'*, $w^2$ being a similar conductor connected to the negative main *w* and to one of the contact-points $s^2$.

Referring now to Figs. 2 and 3, *a* represents the core of the armature, made, preferably, of a magnetizable tube and secured to the armature-shaft *s* by detachable heads *h h*, of some good conducting material, preferably aluminium, such an armature-core having the very desirable feature in connection with instruments of this type of starting and stopping quickly when the current is connected to or disconnected from the coils or windings of the armature *a*, thus acting as a dampening device, which is a feature of great importance in this connection in that it insures an accurate record of sudden or instantaneous variations or changes of potential difference or current flow, as will be more particularly pointed out in connection with the description of the mode of operation. *v v v* represent strips of mica or equivalent insulating material inserted in slots in the ends of the core *a* and held in place by the heads *h h* when the latter are secured to the shaft *s*, the function of said strips being to facilitate the winding of the coils of the armature *a* thereon. The operation of this form of the apparatus is as follows: Suppose the instrument to be a voltmeter and to be connected in circuit with a source of current-supply designed to deliver current to translating devices at a definite voltage, under which condition the index-needle *i* is so adjusted as to stand with the pairs of contacts *p p'* closely adjacent to the pairs of stationary contacts *s' s'* and $s^2$ $s^2$. The field-magnet *f* of the motor, here shown in shunt to the current-mains, is continuously magnetized. Hence when the index-needle *i* is moved to the right under the influence of current flowing through the coil *c*, conductors $w^3$ $w^4$, resistance *r*, conducting-arm *n*, metal bar *d*, conductor $w^9$ to the negative main *w* a branch circuit will be closed from the + current-main *w* by the conductor $w^3$, contacts *s' p s'*, yoke *y*, conductor $w^6$, commutator-brush $b^2$, coils of the armature *a*, commutator-brush $b'$, conductor $w'$, resistance $r^2$ to the negative main *w*, thereby imparting motion to the armature, say, in such direction as to cause the arm *n* to move from left to right. As this conducting-arm *n* moves over the exposed contacts of the variable resistance *r*, connected in circuit with the conductors $w^3$ $w^4$ $w^9$ and coil *c*, it will cause the index-needle *i* to return to its central position, owing to the increased resistance thrown into this circuit. In a similar manner any abnormal diminution of the current flow through the coil *c* will cause the circuit to be closed between the contacts *p'* $s^2$ $s^2$ on the left, thereby causing a branch of the current to flow from the + main *w* through the resistance $r'$, conductor $w'$, commutator-brush $b'$, in a reverse direction, through the coils of the armature $a$, commutator-brush $b^2$, conductor $w^6$, yoke $y$, contacts $s^2$ $p'$ $s^2$ on the left, conductor $w^2$ to the negative main, thereby causing the arm $n$ to move from right to left and the index-needle $i$ to be restored to its normal central position, owing to the increased flow of current through the coil $c$ which will result by virtue of the diminution of the resistance cut out of circuit by the movable conducting-arm $n$ from right to left over the contacts of the variable resistance $r$. The core of the armature $a$ being of magnetizable metal and provided with heads or ends $h$ $h$ of good conducting material, preferably aluminium, will act instantaneously as a magnetic dampening device to check any rotation due to momentum, so that the instant the current is interrupted the arm $n$ will cease to move. For like reason the instant that the circuit is closed in either direction the armature will be set in motion.

Although we prefer to use a dampening device in the nature of a magnetic core provided with conducting-heads $h$ $h$, of light material, such as aluminum, we do not limit this feature of our invention to such a structure, as obviously any of the well-known types of dampening devices which are used in connection with electrical measuring instruments or instruments of percision generally might be applied for the purpose indicated, our claims in this particular being directed broadly to recording apparatus for electrical measuring instruments the recording-stylus of which is driven by an electromotive device and in such manner that when the circuit is interrupted the movable part of the electromotive device will stop instantaneously, so as to cause the recording device to accurately record the current variations, which is the ultimate object sought.

In Fig. 6 of the drawings we have illustrated means for causing the stylus to travel in a right line over the record-surface, in the same manner as disclosed in Figs. 1 and 4, through the agency of a power-driven worm or screw $k$ and how the same may be applied directly to the structural apparatus disclosed in patent to Weston, No. 490,699, above referred to. In this figure of the drawings, D represents the dynamo or source of electrical energy; $w$ $w$, the current-mains operatively connected with translating devices (not shown;) $f$, the field-magnet of the propelling electromotive device for the stylus, the coils of said field-magnet being, as before, in shunt relation to the current-mains. $n'$ is a conducting-arm carried by the vibrating armature in the field of the field-magnets $f$, and $r$ a resistance over which the arm $n'$ passes. $c$ is a movable coil of an electrical measuring instrument, as before, located in the field of a permanent magnet. $p^2$ $p^3$ are stationary contacts, and $i$ an index-needle carried by the coil $c$ and adapted to contact therewith when moved in opposite directions. $w^3$ $w^5$ $w^6$, &c., are conductors connecting the several parts of the apparatus, all of said parts, circuits, and circuit connections being identically the same as the like parts disclosed in the before-mentioned patent to Weston, No. 490,699. Our improvement in this connection embraces a rack or gear $g'$, carried at one end of the arm $n'$ and meshing with a pinion $p^4$, operatively connected with a rotary shaft $s$ and worm or screw $k$, the arm $n$, as before, being provided with the necessary nut or pin for giving to it and the stylus carried thereby motion in either direction as required, so that said stylus will move in a right line over the record surface or sheet on the cylinder $e$. The operation of this modified form will be obvious, it being apparent that the arm $n'$ will be moved from right to left, or vice versa, dependent upon the movement of the index-needle $i$, carried by the coil $c$, and also that when the arm is moved in one direction or the other the index-needle $i$ will ultimately return to its normal or central position, positive motion being imparted through the rack or gear $g'$, pinion $p^4$, shaft $s$, and worm or screw $k$ to the arm $n$, thus placing upon the record sheet or surface a record in the same manner as the like result was attained with the apparatus illustrated in Fig. 1.

In Fig. 4 of the drawings we have illustrated a still further modified form of apparatus for effecting the results sought. In this form of the apparatus the shaft $s$ is driven by a mechanical source of power acting upon magnetic clutches and a pulley $q$. $m$ and $m$ are magnetic clutches adapted to run loosely upon the shaft $s$, said clutches being provided with the usual magnetizing-coils electrically connected with current-collecting rings and pairs of brushes $b$ $b$, resting thereon, to conductors $w^5$ $w^7$ $w^6$ $w^8$ and each provided with gear-teeth $g$ at its outer circumference adapted to mesh, respectively, with pinions $h'$ $h^2$, which in turn mesh with each other. (See Fig. 5.) $n^2$ is a magnetic disk loosely keyed to the shaft $s$ and adapted to be moved in either one direction or the other, according to which of the two clutches is magnetized. The other parts of the apparatus and circuit and circuit connections are not substantially different from the like parts disclosed in Fig. 1, except that the circuit connections are varied here to suit the conditions of the clutching mechanism and the application of power from a mechanically-applied source of energy, a sustained weight being shown for this purpose. The operation of this form will now be described. Suppose an increase of current flow through the coil $c$ to cause the index-needle $i$ to move to the right, thereby closing the circuit between the contacts $p$ and $s'$ $s'$. Consequently current flows from the positive main $w$ by conductor $w^2$, yoke $y$, contacts $s'$ $p$ $s'$, conductor $w^6$, brushes $b$, collecting rings and coil of the right-hand clutch $m$, conductor $w^8$ to the negative main $w$. This causes the right-hand magnetic clutch to draw the magnetic disk $n^2$, which is loosely keyed on the shaft $s$, to the right into frictional contact with its face, thereby imparting motion from the pulley $q$ through the left-hand clutch $m$, pinion $h^2$, pinion $h'$, right-hand clutch $m$, disk $n^2$ to the shaft $s$ in the proper direction to cause the arm $n$ to move, say, from left to right, so that the stylus carried thereby will place upon the record sheet or surface the necessary record and the arm $n$ will cut into the circuit additional resistance to a sufficient extent to cause the index-needle $i$ to return to its normal or central position. Any diminution of the current through the coil $c$ will in like manner cause the index-needle $i$ to vibrate to the left, closing the circuit between the contacts $s^2\ p'\ s^2$, so that now current will flow from the positive-current main $w$ by the conductor $w^2$, yoke $y$, contacts $s^2\ p'\ s^2$, conductor $w^5$, brushes $b$, current-collecting rings and coil of the left-hand clutch $m$, conductor $w^7$ to the negative-current main, magnetizing the disk $n^2$ and causing it to be drawn to the left into frictional contact with the face of the clutch, thereby imparting motion directly from the clutch $m$ to the disk $n^2$, and hence to the shaft $s$, in such a direction as to cause the arm $n$ to move, say, from right to left until the current flow increases through the coil $c$ a sufficient amount to return the needle $i$ to its central position, the proper record in the meantime having been placed upon the record surface or sheet. This form of the apparatus is illustrated to show how our improvements may be utilized in connection with motive devices generally for moving the stylus in different directions.

While we have illustrated in the accompanying drawings and have described hereinbefore a number of modified means whereby the results sought may be accomplished, we do not limit our invention to these specific structural arrangements, as many of the details of our invention may be materially departed from and still come within the scope of our claims hereinafter made.

While we have defined that part of the recording instrument which moves back and forth over the record surface or sheet as a "stylus," we do not wish to be limited in this particular to any specific form of stylus or recording element, as obviously any movable element which would produce upon the record surface or sheet carried by the cylinder $e$ a record-line might be substituted for what is known generically in the art as a "stylus."

Having thus described our invention, what we claim, and desire to secure by Letters Patent of the United States, is—

1. An electrical measuring instrument having a movable part; in combination with an electric motor having a rotary armature capable of making either a fractional part of a revolution or a number of revolutions in opposite directions and a recording instrument having its stylus operatively connected to said armature; together with a circuit and circuit connections and a source of electricity, whereby any substantial movement imparted to the movable part of the measuring instrument will cause the recording-stylus to make a permanent record of the nature and duration thereof, substantially as described.

2. An electrical measuring instrument having a movable part; an electric motor having a rotary armature capable of making either a fractional part of a revolution or a number of revolutions in opposite directions; a recording instrument having a recording-stylus operatively connected to said armature by means adapted to move it in a right line; in combination with circuits and circuit connections between the motor, the movable part of the measuring instrument and a source of electricity, whereby any substantial variation of movement imparted to said movable part will cause a permanent record of the nature and duration thereof, substantially as described.

3. An electrical measuring instrument having a movable part; an electric motor having a rotary armature capable of making either a fractional part of a revolution or a number of revolutions in opposite directions; a recording instrument having a recording-stylus connected to the armature by means adapted to give it movement in opposite directions in a right line, the recording instrument being provided with a record sheet or surface having coördinate record-lines thereon; in combination with circuits and circuit connections between the motor, the movable part of the measuring instrument and a source of electricity, whereby any substantial movement imparted to the movable part of the measuring instrument will cause a permanent record of the nature and duration thereof, substantially as described.

4. An electrical measuring instrument having a movable part; an electromotive device having its armature connected to the stylus of a recording instrument; together with a dampening device capable of instantly stopping the armature of the electromotive device when the circuit is interrupted thereto; in combination with a source of electrical energy and circuits and circuit connections whereby any substantial movement of the movable part of the measuring instrument will cause an accurate permanent record of the nature and duration thereof, substantially as described.

5. An electrical measuring instrument having a movable part; an electric motor having an armature capable of making either a fractional part of a revolution or a number of revolutions in opposite directions, said armature having a tubular core with conducting-heads; in combination with a recording device having a stylus connected to the armature; together with circuits and circuit connections between the movable part of the measuring instrument, the electric motor and a source of electricity, whereby accurate permanent records are made by the current variations, substantially as described.

6. In an electrically-controlled instrument an electromotive device provided with an armature having a dampening-core adapted to suddenly check or stop its movement when the electromotive device is disconnected from the driving source of electrical energy; in combination with a recording-stylus operatively connected to said armature, substantially as described.

EDWARD WESTON.
ADELBERT O. BENECKE.

Witnesses:
W. H. YAWGER,
C. J. KINTNER.